(12) United States Patent
Usui

(10) Patent No.: US 7,401,257 B2
(45) Date of Patent: Jul. 15, 2008

(54) MICROCOMPUTER AND METHOD FOR DEVELOPING SYSTEM PROGRAM

(75) Inventor: Kazuo Usui, Tachikawa (JP)

(73) Assignee: Renesas Technology Corp., Tokyo (JP)

( * ) Notice: Subject to any disclaimer, the term of this patent is extended or adjusted under 35 U.S.C. 154(b) by 82 days.

(21) Appl. No.: 10/569,799

(22) PCT Filed: Aug. 27, 2004

(86) PCT No.: PCT/JP2004/012350

§ 371 (c)(1),
(2), (4) Date: Feb. 27, 2006

(87) PCT Pub. No.: WO2005/022390

PCT Pub. Date: Mar. 10, 2005

(65) Prior Publication Data

US 2007/0006035 A1 Jan. 4, 2007

(30) Foreign Application Priority Data

Aug. 28, 2003 (JP) .............................. 2003-304276

(51) Int. Cl.
*G06F 11/00* (2006.01)
(52) U.S. Cl. ....................................................... 714/27
(58) Field of Classification Search ........................ None
See application file for complete search history.

(56) References Cited

U.S. PATENT DOCUMENTS 6,954,878 B2  10/2005  Kudo
6,973,592 B2 *  12/2005  Debling ......................... 714/30
2003/0056154 A1 *  3/2003  Edwards et al. ............... 714/45
2005/0193251 A1 *  9/2005  Chuang et al. ................. 714/29

FOREIGN PATENT DOCUMENTS

| JP | 11-39184 A | 2/1999 |
| JP | 11-39186 A | 2/1999 |
| JP | 2002-202900 A | 7/2002 |
| JP | 2002-268911 A | 9/2002 |

OTHER PUBLICATIONS

Microsoft Computer Dictionary, 4th. Ed. Microsft Press, 1999, pp. 65, 142,212,379.*

* cited by examiner

*Primary Examiner*—Christopher S Mccarthy
(74) *Attorney, Agent, or Firm*—Miles & Stockbridge P.C.

(57) ABSTRACT

There are provided a central processing unit (2), a high-speed serial communication interface circuit which can be utilized for a debugging interface, for example, a USB interface circuit (3), and an external bus interface circuit (5) which can be connected to an external memory. The USB interface circuit has a plurality of input buffers (EP 1, EP 2) therein and data can be output from one of the input buffers in parallel with an input operation to the other input buffer. In a debugging mode, the USB interface circuit receives a system program, and the system program thus received can be output from the external bus interface circuit together with a memory access control signal. When a target program is to be downloaded from a host computer into a target system, a speed of a data transfer can be increased.

13 Claims, 15 Drawing Sheets

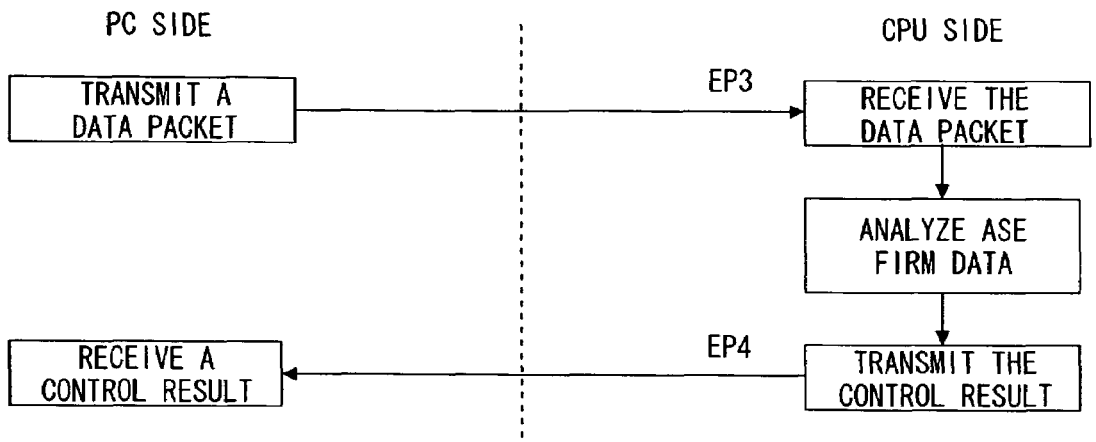
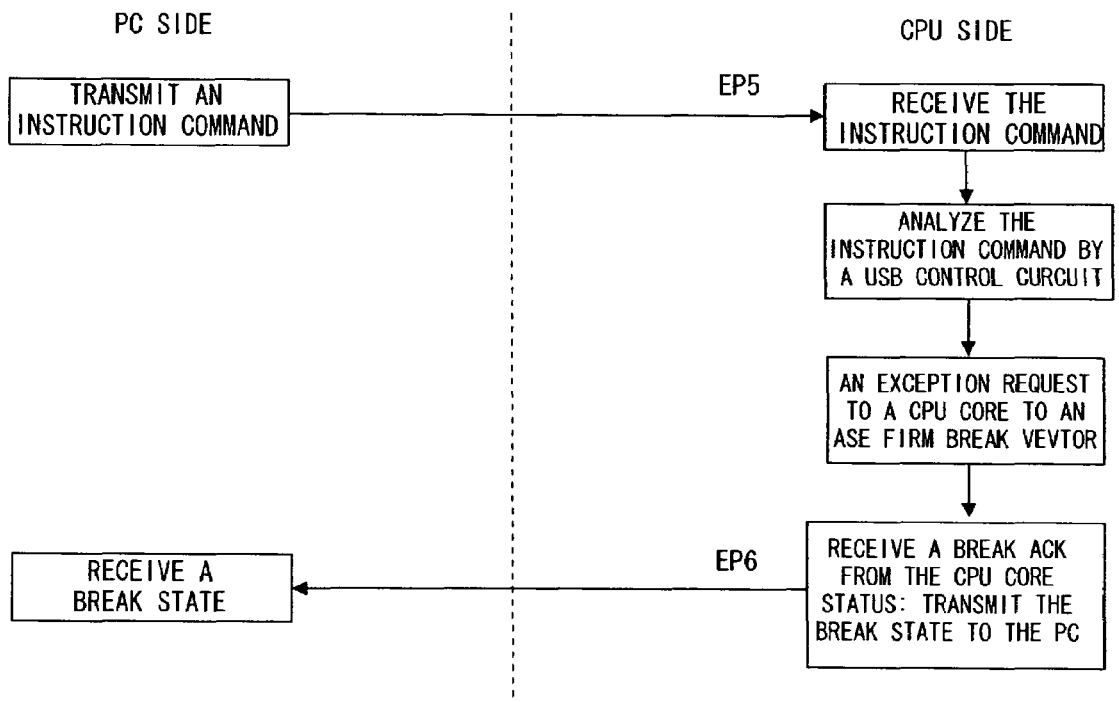

MICROCOMPUTER AND METHOD FOR DEVELOPING SYSTEM PROGRAM

FIELD OF THE INVENTION

The present invention relates to a microcomputer, and particularly, a microcomputer having a debugging support function, and furthermore, a method for developing a system program which operates the microcomputer.

BACKGROUND OF THE INVENTION

A microcomputer having a debugging support function includes a debugging interface for carrying out a communication with an emulator or a host computer in the debugging. For example, a serial input/output interface based on a JTAG (Joint Test Action Group, IEEE std 1149.1, IEEE Standard Test Access Port and Boundary-Scan Architecture) protocol is used for the debugging interface. Patent Document 1 has also described a microcomputer having such a debugging interface.

Patent Document 1: JP-A-2002-202900 (Paragraph 0017)

SUMMARY OF THE INVENTION

The inventor investigated an increase in a speed of a data transfer in a function for downloading a target program from a host computer into a program memory of a target system when a microcomputer having a debugging support function (which will also be referred to as an on-chip debugging function) is subjected to system debugging (a debugging target microcomputer will be referred to as a target microcomputer). For example, the target microcomputer has a debugging serial interface circuit based on the JTAG. An emulator is connected to a personal computer (PC) having a USB (Universal Serial Bus) interface circuit through a USB cable, and is connected to a debugging serial interface of the target microcomputer mounted on a target system (which will also be referred to as a user system) through a dedicated user interface cable. The target microcomputer has the on-chip debugging function. The target microcomputer having the on-chip debugging function has a debugging mode for supporting a development of the target program in addition to a user mode. In the user mode, a system program (which will also be referred to as a target program) to be a user program developed for the target system by a user is executed. In the debugging mode, when the execution of the user program is stopped, a program for a program debugging support (which will also be referred to as a debugging support program) is mainly executed. The debugging support program is transferred by emulator software over the host computer every time a power supply of the target microcomputer is turned on, and is written onto a debugging address space in the target microcomputer and is linked to the emulator software on the host computer. The target microcomputer executes the debugging support program in the user mode so that the user program supplied from the host computer is written to a predetermined memory space on the target system. The debugging serial interface circuit based on the JTAG is used in the communication between the emulator and the target microcomputer. The debugging serial interface circuit carries out a serial transfer which is clock synchronous on a unit of a predetermined byte. Therefore, a transfer speed is proportional to the clock frequency and is lower than that in the USB interface circuit. For example, a transfer throughput is 1200 kilobytes (KB)/second in a full speed in the USB standards 1.1. However, the interface based on the JTAG requires a data transfer procedure for acquiring a status indicative of an access permission from the target microcomputer every maximum data transfer, for example, 4 bytes and setting next transfer data. Because of an overhead, a transfer speed limit, for example, 230 KB/second is generated even if a synchronous clock frequency is increased. The inventor found that a long time is required for a load transfer of a target program having a comparatively large capacity due to a difference in the transfer speed and a system debugging efficiency is reduced, resulting in one of factors for inhibiting a reduction in a development period for the target program.

It is an object of the invention to increase a speed of a data transfer when downloading a debugging target system program from a host computer into a target system in the case in which a target microcomputer is subjected to system debugging.

It is another object of the invention to contribute to a reduction in a development period for a system program in respect of an increase in a speed of a data transfer when downloading a debugging target system program from a host computer into a target system in the case in which an emulator is utilized to develop the system program.

The above and other objects and novel features of the invention will be apparent from the description of the specification and the accompanying drawings.

The summary of the typical invention disclosed in the application will be briefly described below.

[1] A microcomputer according to the invention comprises a central processing unit, a high-speed serial communication interface circuit (3) which can be utilized for a debugging interface, and an external bus interface circuit (5) which can be connected to an external memory. The high-speed serial communication interface circuit has a plurality of input buffers (EP 1, EP 2) therein and data can be mutually output from one of the input buffers in parallel with an input operation to the other input buffer. The high-speed serial communication interface circuit receives a system program in the debugging mode and the system program thus received can be output from the external bus interface circuit together with a memory access control signal. The high-speed serial communication interface circuit is a universal serial bus interface circuit, for example. In the system debugging, the host computer is directly connected to the high-speed serial communication interface circuit. Consequently, it is possible to increase a speed of a data transfer when downloading a target program from the host computer to the target system. In particular, the speed of the data transfer can further be increased in that the high-speed serial communication interface circuit has the two-plane buffers which can mutually switch input/output operations to carry out parallel operations. The increase in the speed of the data transfer in the download of the target program from the host computer to the target system can contribute to a reduction in a period for developing the target program.

In a desirable configuration according to the invention, there is provided a direct memory access controller capable of carrying out a control to transfer the received system program to a memory connected to the external bus interface circuit. It is convenient for a reduction in a burden on the central processing unit and a further increase in the speed of the data transfer. A transfer source of the system program through the direct memory access controller is an input buffer of the high-speed serial communication interface circuit, for example. In the case in which there is provided a random access memory (7) capable of temporarily storing a system program received by an input buffer of the high-speed serial communication interface circuit, a transfer source of the system program through the direct memory access controller may be the random access memory. The multistage buffer is constituted by the input buffers (EP 1, EP 2) of the high-speed serial communication interface circuit and the random access memory (7) to receive the system program. Therefore, there is further room for a difference in a speed between the receipt processing of the high-speed serial communication interface circuit and the transfer processing for the received data.

In a desirable configuration according to the invention, there is provided a debugging dedicated low-speed serial communication interface circuit (8), the debugging dedicated low-speed serial communication interface circuit being usable for inputting control data to control the high-speed serial communication interface circuit in the debugging mode. The debugging dedicated low-speed serial communication interface circuit is a serial interface circuit based on the JTAG, for example, and can carry out an interface operation without requiring the control of the central processing unit. For example, the debugging dedicated low-speed serial communication interface circuit is usable for receiving the system program in place of the high-speed serial communication interface circuit in the debugging mode.

In respect of the completeness of the debugging support function, a trace control circuit may be included. The trace control circuit successively stores, as trace information, an internal state obtained when the central processing unit executes the system program. The trace information thus stored is output to an outside after the execution of the system program is stopped. The high-speed serial communication interface circuit can be utilized for an external output of the trace information.

[2] A method for developing a system program according to the invention serves to develop a system program which is to be executed by a target device by using a host computer (25), an emulator (35) and a target device (33), and comprises a first processing of storing a system program output through a high-speed serial communication by the host computer in one of two-plane buffers as a processing to be carried out by the emulator, a second processing of transmitting a system program stored in the other buffer to the target device through a low-speed serial communication in parallel with the first processing, and a third processing of carrying out a handshake control of the low-speed serial communication together with the target device. By utilizing the two-plane buffers, it is possible to increase the speed of the data transfer when downloading the target program from the host computer into the target system. In this respect, it is possible to shorten a period for developing the target program.

In a specific configuration according to the invention, the system program output from the buffer is transmitted through the low-speed serial communication to the target device via an FIFO buffer having a storage capacity which is equal to or larger than that of one of the buffers in the second processing, and a transmission from the FIFO buffer to the target device is carried out in response to a transmission permission sent from the target device, thereby suppressing a transfer from the buffer to the FIFO buffer in response to a full state of the FIFO buffer in the third processing. By using the FIFO buffer in the low-speed serial communication, it is possible to decrease an interruption of the first processing due to the stay of the data to be transferred from the first processing to the second processing. Also in this respect, it is possible to increase the speed of the data transfer.

[3] A microcomputer (1) according to the invention has a user mode and a debugging mode, and comprises a central processing unit (2), a universal serial bus interface circuit (3), an ROM (71) retaining a first debugging control program, an RAM (7), and an external bus interface circuit (5). The universal serial bus interface circuit has a predetermined endpoint buffer circuit (20) which can be utilized in the debugging mode, the predetermined endpoint buffer circuit has a pair of buffers (EP 1, EP 2) which can be operated in parallel, and one of the buffers can be caused to carry out an input operation and the other buffer can be caused to carry out an output operation in parallel therewith. The microcomputer to be a target is a target microcomputer, and is supposed to be directly connected to the host computer for a debugging support through the universal serial bus interface circuit.

When the debugging mode is designated in a power-on reset, the central processing unit executes the first debugging control program to initialize the universal serial bus interface circuit to be operable, a second debugging control program is received by the universal serial bus interface circuit, the second debugging control program thus received is stored in the RAM, and a transition to an execution of the second debugging control program stored in the RAM is made. Consequently, it is possible to download the second debugging control program to be transferred through the emulator software over the host computer at a high speed every time the power supply of the microcomputer is turned on, for example. Consequently, it is possible to increase a speed of a rise in a debugging controllable state which is linked to the emulator software over the host computer.

As a specific configuration according to the invention, there is further provided a buffer RAM and a direct memory access controller, and the central processing unit causes the direct memory access controller to transfer the user program received by the universal serial bus interface circuit to the buffer RAM in response to a download request command received by the universal serial bus interface circuit in accordance with the second debugging control program. In the debugging controllable state, it is possible to increase the speed of the download of the user program. As a desirable configuration according to the invention, furthermore, the central processing unit causes the direct memory access controller to carry out a control to transfer a program transmitted to the buffer RAM through an external bus interface circuit to the external program memory in response to a transfer request command received by the universal serial bus interface circuit in accordance with the second debugging control program. Then, the central processing unit makes a transition to the user mode in response to a mode control command in an execution state of the second debugging control program, and the central processing unit fetches an instruction from the program memory through the external bus interface circuit in the user mode, thereby executing the user program. By tracing and analyzing the execution state of the user program, the user program is debugged.

[4] A microcomputer (40) according to the invention in another respect comprises a central processing unit (44), a universal serial bus interface circuit (48), an ROM (45) retaining a first debugging control program, a buffer RAM (47), and an external interface circuit (41), and the universal serial bus interface circuit has a predetermined endpoint buffer circuit (20), the predetermined endpoint buffer circuit has a pair of buffers (EP 1, EP 2) which can be operated in parallel, and one of the buffers can be caused to carry out an input operation and the other buffer can be caused to carry out an output operation in parallel therewith. In a power-on reset, the central processing unit executes the first debugging control program to initialize the universal serial bus interface circuit to be operable, a second debugging control program is received by the universal serial bus interface circuit, the second debugging control program thus received is stored in the buffer RAM, and the second debugging control program stored in the buffer RAM is output through the external interface circuit. The microcomputer to be the target is a microcomputer for a control of the emulator (33) to be disposed between the target microcomputer and the host computer for a debugging support.

As a specific configuration according to the invention, the microcomputer further comprises a direct memory access controller (46), and the direct memory access controller transfers the second debugging control program from the buffer RAM to an outside through the external interface circuit in accordance with a transfer control condition set by the central processing unit.

Brief description will be given to advantages obtained by the typical invention disclosed in the application.

More specifically, it is possible to increase the speed of the data transfer when downloading the system program from the host computer into the target system in the case in which the target microcomputer is subjected to the system debugging. In short, it is possible to enhance the performance of the system program downloading function in the system debugging.

In the case in which the emulator is utilized to develop the system program, the period for developing the system program can be shortened in respect of an increase in the speed of the data transfer when downloading the system program from the host computer into the target system.

BRIEF DESCRIPTION OF THE DRAWINGS

FIG. 14 is a flowchart illustrating a basic form of a communication handshake control of the host computer and a USB interface circuit, FIG. 15 is a flowchart illustrating handshake control contents between the host computer and the USB interface circuit in the case in which forcible break is carried out during the execution of a user program.

DETAILED DESCRIPTION OF THE PREFERRED EMBODIMENTS

Figure 1:
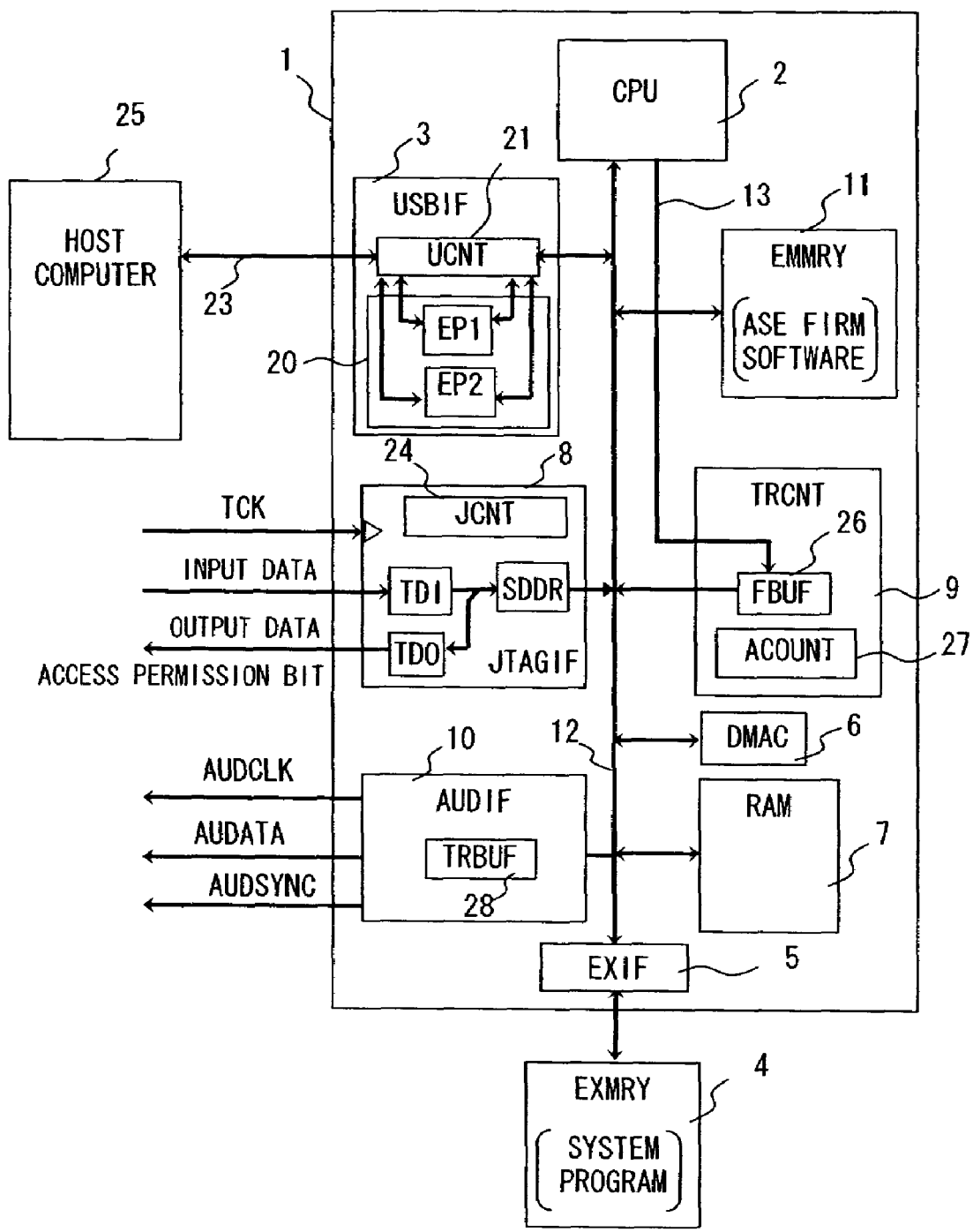
FIG. 1 is a block diagram illustrating a microcomputer according to the invention.

FIG. 1 illustrates a microcomputer 1 according to the invention. The microcomputer 1 is formed on a semiconductor substrate (semiconductor chip) such as single crystal silicon by a complementary MOS integrated circuit manufacturing technique. The microcomputer 1 comprises a central processing unit (CPU) 2, a USB interface circuit (USBIF) 3 to be a high-speed serial communication interface circuit which can be utilized for a debugging interface, an external bus interface circuit (EXIF) 5 which can be connected to an external memory (EXMRY) 4, a direct memory access controller (DMAC) 6, a random access memory (RAM) 7, a JTAG interface circuit (JTAGIF) 8 to be a debugging dedicated low-speed serial communication interface, a trace control circuit (TRCNT) 9, an AUD (advanced user debugging) interface circuit (AUDIF) 10 for controlling an external output of trace information, and an emulation RAM (EMMRY) 11, and they share an internal bus (IBUS) 12, which is not particularly restricted. Another circuit such as a timer counter may be connected to the internal bus 12. The RAM 7 is utilized as a buffer RAM or the like for temporarily holding transfer data.

The USBIF 3 is based on USB2.0 standards, for example, and has a USB buffer portion (BEP) 20 and a USB interface control portion (UCNT) 21. The USB buffer portion 20 has a double buffer structure by USB buffers EP 1 and EP 2 having 512 bytes respectively. The USB buffers EP 1 and EP 2 are constituted by an FIFO, for example. The UCNT 21 carries out a so-called USB device control and data transfer control. The UCNT 21 is connected as a USB host to a USB host mounted on the host computer (personal computer) in FIG. 1 through a USB cable 23, and a serial transmitting/receiving control of data is performed as the USB device control in a predetermined protocol in response to a command sent from the USB host. Data received from the USB host are transmitted to the buffer portion 20 and data to be transmitted to the USB host are supplied from the buffer portion 20. The UCNT 21 carries out a read/write control for the buffer portion 20 and a control for a transfer request for the DMAC 6 as the data transfer control. In the read/write control for the buffer portion 20, particularly, it is possible to mutually carry out a data output operation from one of the USB buffers (an output operation to the internal bus 12 for a DMA transfer) in parallel with an input operation to the other USB buffer (a received data input operation from the USB host).

A data transfer control condition such as a transfer source address or a transfer destination address is set by the CPU 2 so that the DMAC 6 controls a data transfer from a transfer source to a transfer operation in response to a DMA transfer request given from the USBIF 3 or the like. Both a dual addressing mode and a single addressing mode are supported as a data transfer mode. For example, it is possible to control a data transfer to be carried out by a single address between the USB buffers EP 1 and EP 2 and the EMMRY 11, a data transfer to be carried out by a single address between the USB buffers EP 1 and EP 2 and the RAM 7, and a data transfer to be carried out by a dual address between the RAM 7 and the EXMRY 4.

The JTAGIF 8 has an input register TDI for inputting received data, an output register TDO for outputting data to be transmitted, a data register SDDR for connecting the register TDI to the internal bus 12, a command register which is not shown, and a JTAG control circuit (JCNT) 24. The JCNT 24 controls a serial output from the register TDO and a serial input to the register TDI synchronously with a clock signal TCK. A so-called TAP (test-access-port) control is used for the control, and the control is carried out depending on a pattern of a 1-bit mode select signal (not shown) which is serially input synchronously with the clock signal TCK. A data input from an outside to the JTAGIF 8 can be carried out every time an access permission bit is output from the register TDO to the outside. For example, the JTAGIF 8 outputs the access permission bit to the outside for a 4-byte receipt. In this meaning, a serial communication speed obtained by the JTAGIF 8 is low. In the standards, a TCK frequency is several tens MHz and is lower than a transfer throughput of 480 MB/second at a high speed in the USB2.0 standards.

The CPU 2 includes an instruction control portion and a calculating portion which are not shown. The instruction control portion controls an instruction fetch and decodes the fetched instruction. The calculating portion carries out a data calculation and an address calculation by using an instruction decode signal and an operand specified by an instruction, thereby executing the instruction. The microcomputer 1 has a debugging mode for supporting a development of a target program in addition to a user mode to be a normal mode. The debugging mode can be specified through a mode terminal in a reset or a break interruption in the user mode. In the user mode, a system program stored in the EXMRY 4 (which will also be referred to as a user program) is executed. In the debugging mode, when the execution of the user program is stopped, a program for supporting program debugging (a debugging support program) is mainly executed. The debugging support program is transferred by the emulator software of a host computer 25 every time the power supply of the microcomputer 1 is turned on, and is written onto an address space for debugging of the EMMRY 11. A boot program is retained by a mask ROM (not shown) provided in the microcomputer 1 or an electrically rewritable flash memory. In the debugging, the microcomputer 1 executes the debugging support program in the debugging mode so that the user program is written to the EXMRY 4 over the target system. The user program is supplied from the host computer 25.

In FIG. 1, the USBIF 3 can be utilized for a communication between the microcomputer 1 of the target system and the host computer 25. The JTAGIF 8 can also be utilized and the USBIF 3 is more excellent in respect of a communication speed. Therefore, the utilization of the USBIF 3 is the best way. In particular, the USBIF 3 includes the two-plane buffers EP 1 and EP 2 which can alternately switch input/output operations to carry out a parallel operation. In this respect, it is possible to implement a further increase in the speed of the data transfer. In respect of an increase in the speed of the data transfer in the download of the user program from the host computer 25 into the target system, it is possible to shorten a period for the development of the user program.

In order to transfer the system program received by the USBIF 3 to the EXMRY 4 connected to the EXIF 5, it is preferable to use the DMAC 6. The transfer source of the system program through the DMAC 6 is the input buffers EP 1 and EP 2 of the USBIF 3, for example. In the case in which the system program received by the input buffers EP 1 and EP 2 of the USBIF 3 is temporarily stored in the RAM 7, it is preferable that the system program should be first transferred from the buffers EP 1 and EP 2 to the RAM 7 through the DMAC 6 and should be transferred from the RAM 7 to the EXMRY 4 in a proper timing. A multistage buffer is constituted by the input buffers EP 1 and EP 2 of the USBIF 3 and the RAM 7 to receive the system program. Consequently, it is possible to have a further margin for a difference in a speed between the receipt processing of the USBIF 3 and a transfer processing to an outside for the received data.

The JTAGIF 8 can be utilized for the input of control data for controlling the USBIF 3 in the debugging mode. The JTAGIF 8 can be utilized for the receipt of the system program in place of the USBIF 3 in the debugging mode, for example. There is the necessity in an environment in which the use of the USBIF 3 is reserved in the user mode and the USBIF 3 cannot be utilized for the program download in the user mode. The USBIF 3 may have such a structure as to include a plurality of transfer channels. If one of them is dedicated to on-chip debugging, it is not necessary to carry out the program download in an alternate communication through the JTAGIF 8. Therefore, an increase in the speed of the data transfer can be guaranteed.

The TRCNT 9 is a circuit for sequentially storing an internal state of the CPU 2 through a trace bus 13 when the CPU 2 executes the user program. A place for storage is set to be an FIFO buffer (FBUF) 26 and an address control for the FIFO buffer 26 is carried out by an address counter (ACOUNT) 27. Trace information stored in the FIFO buffer 26 can be transferred to the host computer 25 by means of the USBIF 3 or the JTAGIF 8 in the debugging mode. Since the FIFO buffer 26 has a small capacity, it is unsuitable for tracing a large amount of data. In the case in which the large amount of data are collected as the trace information, the AUDIF 10 is used. It is preferable that address information and data information of the internal bus 12 should be stored in a trace buffer (TRBUF) 28 every bus access cycle and data in the TRBUF 28 should be output to an outside synchronously with a clock signal AUDCLK. AUDATA indicates output data and AUDSYNC indicates a data output synchronization signal.

Alternatively, the trace information stored in the FIFO buffer 26 can be temporarily stored in the RAM 7 and the EXMRY 4 and can also be output in a batch by using the USBIF 3.

Figure 2:
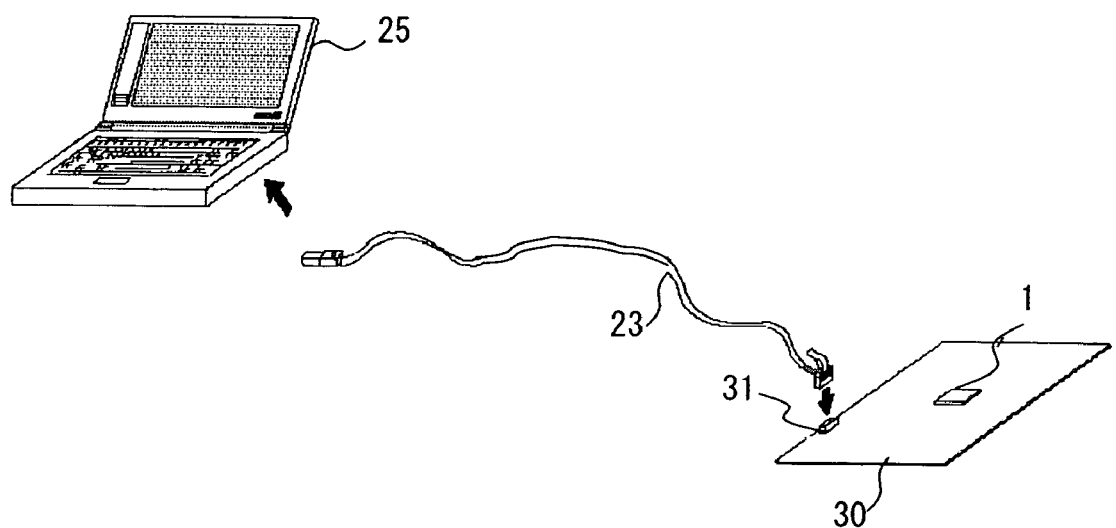
FIG. 2 is an explanatory view showing a connecting configuration of a target system mounting a microcomputer including a USBIF and a host computer.

FIG. 2 shows a connecting configuration of a target system 30 mounting the microcomputer 1 and the host computer 25. The target system 30 is provided with a USB connector 31 to be connected to the USBIF 3 of the microcomputer 1, and it is preferable that the USB connector 31 and a USB connector of the host computer 25 should be directly connected to each other through the USB cable 23. The microcomputer 1 has a debugging function. Therefore, it is possible to download a system program to be a target program and a debugging support program without providing an emulator between the host computer 25 and the microcomputer 1. In a subsequent user mode, the trace information is collected during the execution of the system program. When the execution of the system program is broken to make a transition to the debugging mode, an evaluation for the target system and a correction of the system program are carried out with reference to the trace information.

Figure 3:
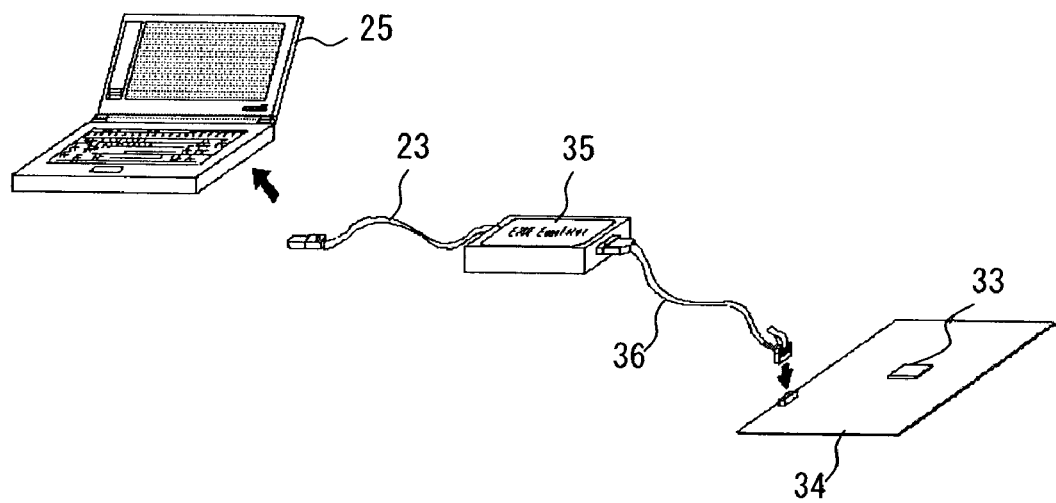
FIG. 3 is an explanatory view showing a connecting configuration of a target system mounting a microcomputer having no USBIF and the host computer.

FIG. 3 shows a connecting configuration of a target system 34 mounting a microcomputer 33 which does not include the USBIF 3 and the host computer 25 as another example. An emulator 35 is disposed between the target system 34 and the host computer 25. The emulator 35 and the host computer 25 are connected to each other through the USB cable 23. The target system 34 and the emulator 35 are connected to each other through a JTAG interface cable 36.

Figure 4:
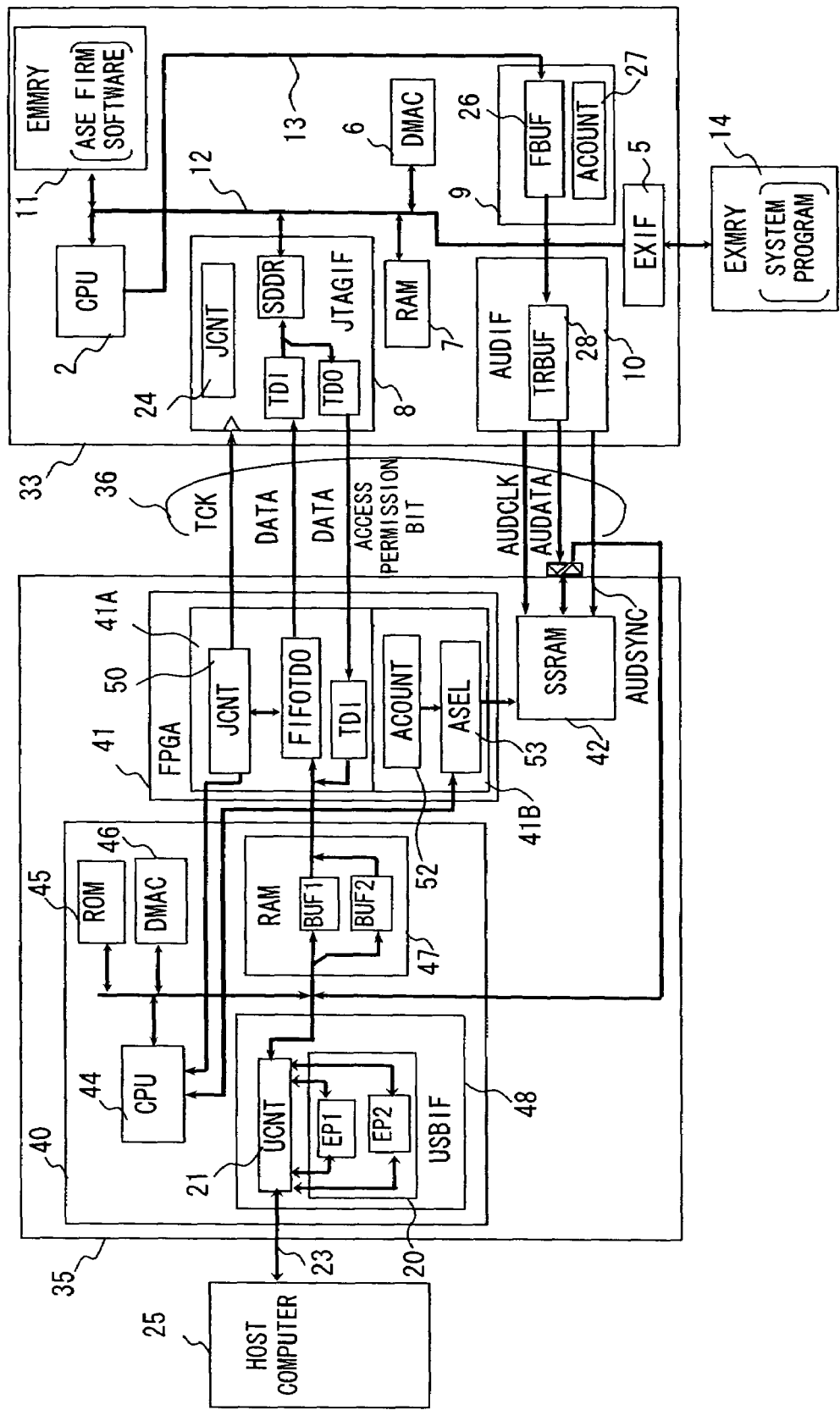
FIG. 4 is a block diagram showing an example of the microcomputer in FIG. 3 and an emulator.

FIG. 4 shows an example of the microcomputer 33 and the emulator 35. The microcomputer 33 is different from the microcomputer 1 in FIG. 1 in that the USBIF 3 is not provided. Circuit elements having the same functions are indicated by the same reference numerals and detailed description thereof will be omitted.

The emulator 35 is constituted by a microcomputer 40, a field programmable gate array (FPGA) 41, and a synchronous static random access memory (SSRAM) 42.

The microcomputer 40 has a CPU 44, an ROM 45, a DMAC 46, an RAM 47 and a USBIF 48 and is formed on a semiconductor substrate. The USBIF 48 is constituted by a USB buffer portion 20 having USB buffers EP 1 and EP 2 on two planes and a UCNT 21, and is based on the USB2.0 standards in the same manner as the USBIF 3. The RAM 47 constitutes a 2-plane RAM buffer in a second stage for information stored in the USB buffers EP 1 and EP 2, and a first RAM buffer region BUF 1 and a second RAM buffer region BUF 2 are assigned. It is desirable to provide dual ports having individual access ports for the first RAM buffer region BUF 1 and the second RAM buffer region BUF 2. More specifically, when the USB buffer EP 1 stores data received from a host computer 25, data to be output from the USB buffer EP 2 can be stored in the first RAM buffer region BUF 1 of the RAM 47 and data stored in the second buffer region BUF 2 can be output from a predetermined port to an outside at the same time. When the USB buffer EP 2 stores the data received from the host computer 25, moreover, the data output from the USB buffer EP 1 can be stored in the second RAM buffer region BUF 2 of the RAM 47 and data stored in the first RAM buffer region BUF 1 can be output from a predetermined port to the outside at the same time. It is desirable to use the DMAC 46 for a data transfer from the USBIF 48 to the RAM 47.

The FPGA 41 is a circuit which has a large number of nonvolatile storage units such as a flash memory cell and can desirably set a logical function corresponding to a programming state of the nonvolatile storage units. The FPGA 41 constitutes a JTAG interface logic 41A for transmitting/receiving data to/from a JTAGIF 8 of the microcomputer 33, and an address generating logic 41B for carrying out an access control of the SSRAM 42.

The JTAG interface logic 41A has an output FIFO buffer FIFOTDO, an input buffer TDI, and an interface control circuit (JCNT) 50. In a data write to the output FIFO buffer FIFOTDO from the RAM 47, the CPU 44 for executing a USB interface control program manages a writable state (TDOST) to the output FIFO buffer FIFOTDO, an empty state (TDOF) and the like, and continuously sets transfer data to the output FIFO buffer FIFOTDO. The JCNT 50 monitors an access permission bit sent from the JTAGIF 8 of the microcomputer 33. When the access permission bit is enabled, 4-byte information is transmitted from the output FIFO buffer FIFOTDO. The information transmitted from the output FIFO buffer FIFOTDO is received by the JTAGIF 8 of the microcomputer 33 and is stored in a data register SDDR. When the information is stored in the data register SDDR, a DMAC 6 is started and the information is written to an EXMRY 14 through a DMA transfer.

The SSRAM 42 is utilized for storing trace information output from an AUDIF 10 of the microcomputer 33. An address generating logic for carrying out the access control of the SSRAM 42 implemented by the FPGA 41 constitutes an address counter (ACOUNT) 52 and a selector (ASEL) 53. The selector 53 selects whether the addressing of the SSRAM 42 is carried out by the CPU 44 or the address counter 52. The selection is determined in accordance with an instruction of the CPU 44.

Thus, the 2-plane buffers constituted by the buffers BUF 1 and BUF 2 capable of inputting and outputting received data in parallel, and the output FIFO buffer FIFOTDO capable of storing the received data output from one of the two-plane buffers in an FIFO format are provided between the USBIF 48 connected to the host computer 25 and the JTAGIF 8 of the target computer 33. Therefore, the host computer 25 and the microcomputer 33 are not directly connected to each other through the UISB interface. However, it is possible to increase a data transfer efficiency to some extent.

In particular, the built-in RAM 47 is set to have a double buffer structure having several kilobytes and the processing is carried out in parallel in such a manner that the data held in one of the buffers BFU 1 and BFU 2 are written to the output FIFO buffer FIFOTDO during the receipt of the data downloaded from the host computer 25 to the other buffer BFU 1 or BFU 2. Also in the case in which data sizes of the buffers EP 1 and EP 2 are different from the data size of the buffer FIFOTDO and it is necessary to put a restriction that the DMAC transfer is not interrupted in the middle because the operations of the buffers EP 1 and EP 2 and the operation of the buffer FIFOTDO are independent of each other, therefore, it is possible to take a countermeasure.

Figure 5:
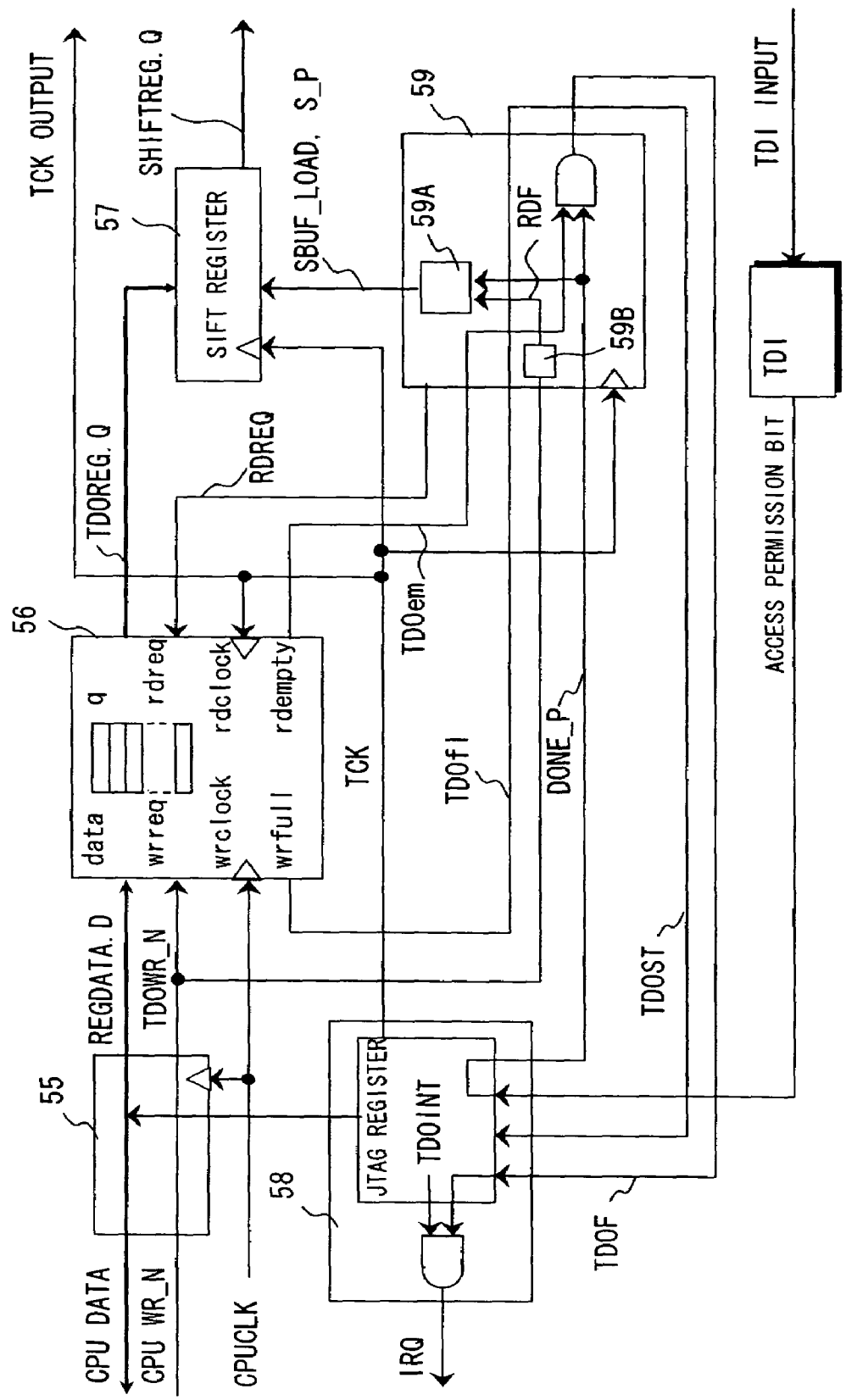
FIG. 5 is a logical circuit diagram showing the details of a JTAG interface logic constituted by an FPGA.
Figure 6:
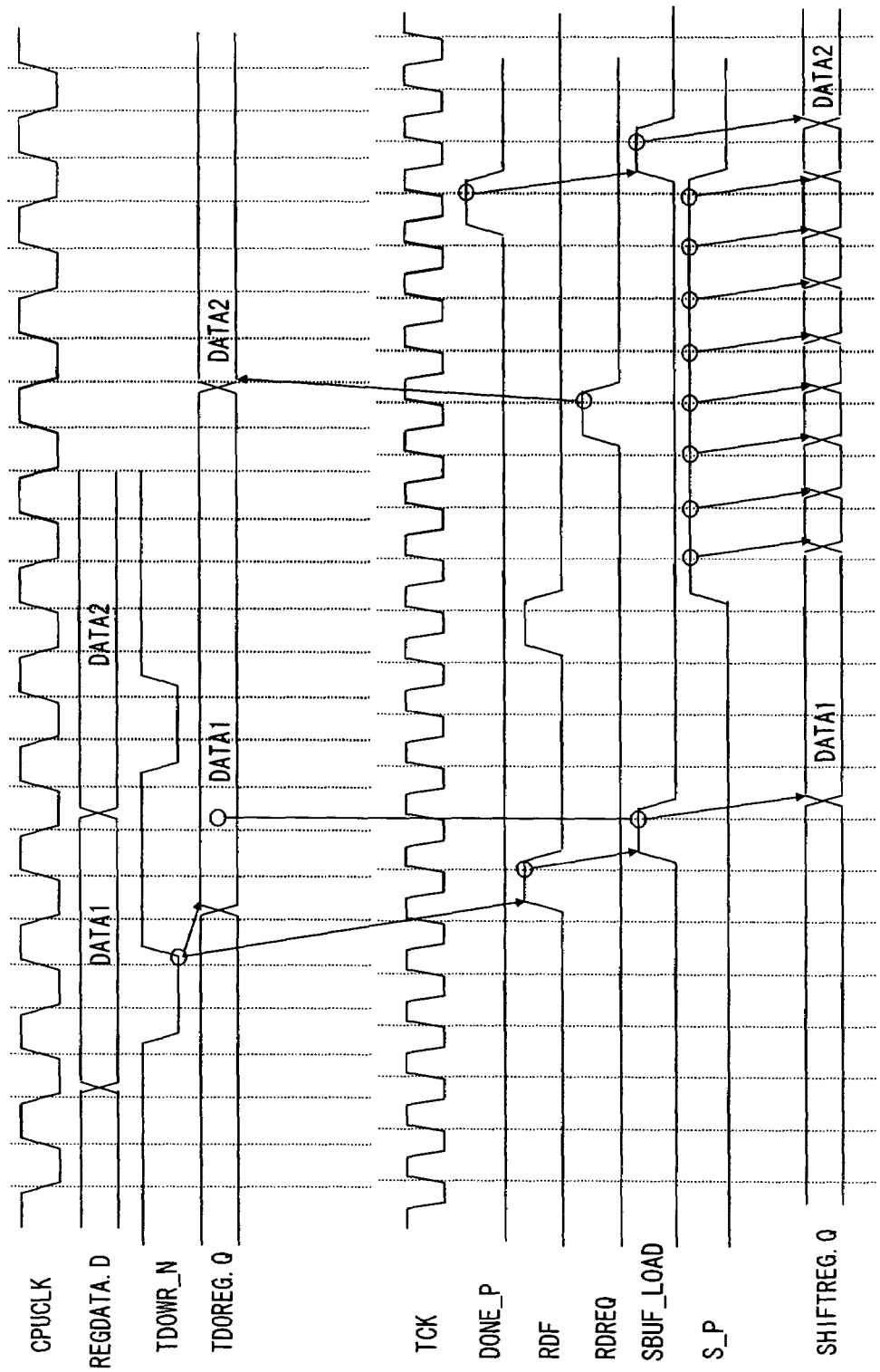
FIG. 6 is a timing chart showing an operation to be carried out by the structure of FIG. 5.

FIG. 5 shows the details of the JTAG interface logic 41A constituted by the FPGA 41. FIG. 6 shows an operation timing in FIG. 5.

The buffer FIFOTDO has a multistage structure of 4 bytes by 61 stages (244 bytes). 55 denotes an interface to be connected to the microcomputer 40. The buffer FIFOTDO is constituted by an FIFO 56 and a shift register 57. A control block 58 and a buffer control block 59 constitute the JCNT 50. 59A and 59B indicate a predetermined logic. CPUDATA (REGDATA.D) indicates data output from the RAM 47, CPUWR_N (TDOWR_N) indicates a write request for the FIFO 56, TDOREG.Q indicates read data transmitted from the FIFO 56, RDREQ indicates a read request for the FIFO 56, and SHIFTREG.Q indicates output data (TDO output) of the shift register 57. SBUF_LOAD indicates a data load signal of the shift register 57 and S_P indicates a shift signal of the shift register 57. TDOem indicates an empty signal of the FIFO 56 and TDOfl indicates a full signal of the FIFO 56. TDOST indicates whether a write to the buffer FIFOTDO can be carried out or not, and 1 indicates "writable" and 0 indicates "non-writable". In the TDOF, 1 indicates that all the data of the buffer FIFOTDO are shifted out and 0 indicates that any of the data of the buffer FIFOTDO are not shifted out (an initial value). TDOINT indicates a signal for outputting an interruption request signal IRQ when all of the data of the buffer FIFOTDO are shifted out, and 1 indicates that an interruption request can be given and 0 indicates the suppression of the interruption request (an initial value).

The data (REGDATA.D) are written to the FIFO 56 in a CPU clock CPUCLK synchronization in response to the write enable (TDOWR_N) through the RAM 47 of the microcomputer 40. When the FIFO 56 is set in a full state, the TDOfl is output synchronously with the CPU clock CPUCLK. When the FIFO 56 is set in an empty state, the TDOem is output synchronously with a clock TCK. A data transfer start load pulse (SBUF_LOAD) to be sent to the shift register 57 is generated synchronously with the write enable (TDOWR_N) when the FIFO 56 is empty, and is generated synchronously with a transfer end pulse (DONE_P) when the FIFO 56 is not empty. This function is implemented by the logics 59A and 59B. The DONE_P is generated based on the access permission bit sent from the target microcomputer 33. The access permission bit is input through the register TDI. In the buffer control block 59, the TDOfl indicative of a data writable state of the FIFO 56 is checked every data transfer end of the shift register 57. The TDOfl generates a TDOST bit indicative of a writable state of the buffer FIFOTDO and the TDOF bit indicative of the empty state of the buffer FIFOTDO is generated by the TDOem and the DONE_P, thereby reflecting the JTAG register of the control block 58. In the case in which the TDOF is used for an interruption request to be given to the microcomputer 40, an interruption request signal IRQ is generated by the TDOINT bit indicative of an interruption permission and the TDOF. When the CPU 44 accepts the interruption request, switching to a next RAM buffer (S7) in the execution of a TDO data set processing in FIG. 7 is carried out.

Figure 7:
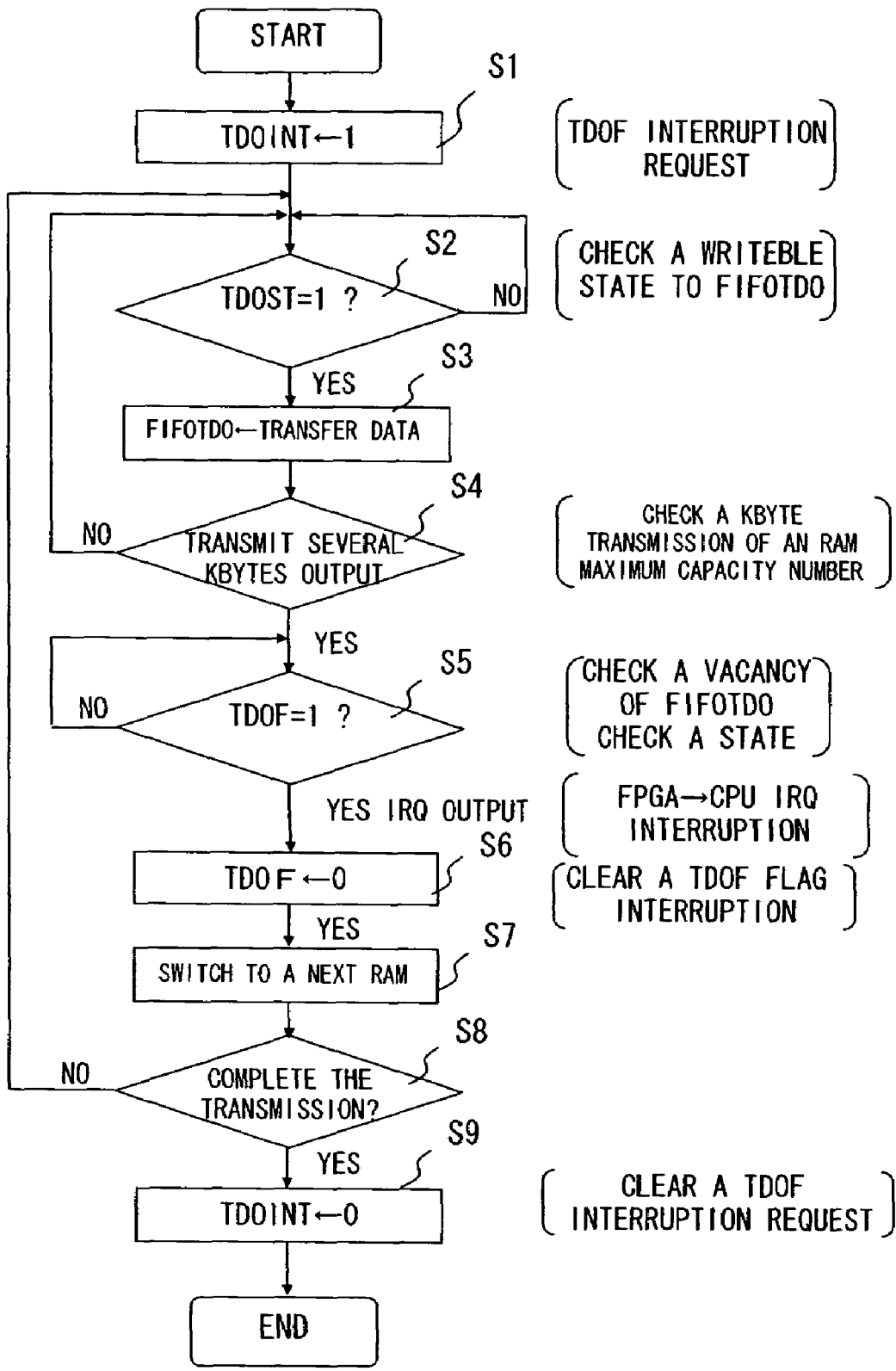
FIG. 7 is a flowchart showing a control procedure for switching two-plane buffers BUF 1 and BUF 2 of an RAM to transfer data to an FIFOTDO.

FIG. 7 shows a control procedure for switching the two-plane RAM buffers BUF 1 and BUF 2 of the RAM 47 and transferring data to the buffer FIFOTDO. First of all, the TDOINT capable of carrying out the control procedure is set to be 1 (S1) and whether the buffer FIFOTDO is empty is checked depending on whether the TDOST is equal to 1 or not (S2). If the buffer FIFOTDO has a vacancy, data are transferred to the buffer FIFOTDO (S3). A byte number of the transferred data is checked. More specifically, it is decided whether the number is a maximum capacity number in a region to be assigned to each of the buffers BUF 1 and BUF 2 (S4). When the transfer byte number is reached, the vacancy of the FIFOTDO is checked depending on a decision whether the TDOF is equal to 1 or not (S5). If it is decided that a shift-out is completely carried out, an interruption request is given to the CPU 44 through the IRQ, and the TDOF is cleared to be 0 (S6). Then, a transfer source RAM buffer region is switched into the next buffer BUF 1 or BUF2 (S7). The processing is repeated till the completion of the transmission (S8). After the completion, the TDINT is cleared to be 0 (S9) and the control is ended.

Figure 8:
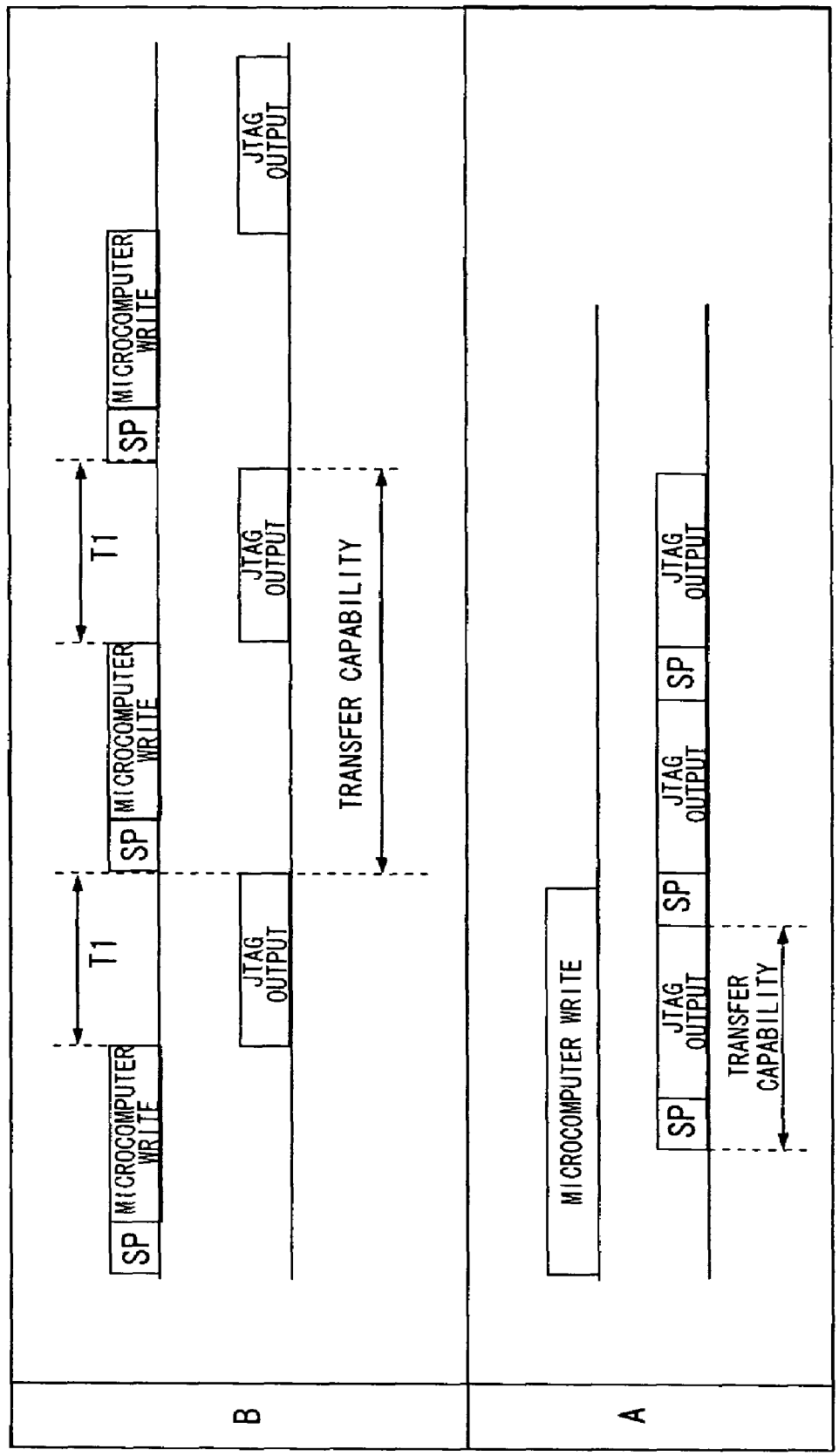
FIG. 8 is a timing chart showing a difference in an operation timing of a program download in each of cases in FIGS. 5 and 9.

In the data write transfer from the buffer BUF 1 to the buffer FIFOTDO, thus, a kilobyte number of a maximum capacity of the RAM 47 is transferred with reference to the writable state (TDOST bit) of the buffer FIFOTDO and the empty state (TDOF) of the buffer FIFOTDO is then confirmed, and subsequently, switching to the next buffer BUF 2 or BUF 1 is carried out and this processing is repeated until a specified data volume is transferred completely. In a data write from the RAM 47 to the buffer FIFOTDO, consequently, the TDOST bit and the TDOF bit are managed to continuously set the transfer data. The access permission bit transmitted from the microcomputer 33 to the buffer TDI is monitored by the hard logic 58. As a result, an overhead is eliminated from the detection of the access permission bit to the transfer of the data and a continuous transfer of several hundreds bytes at a maximum can be carried out so that a speed of a download transfer of a user program can be increased as shown in FIG. 8(A). Also in the case in which the target microcomputer does not have the USBIF 3, the program download transfer speed can be increased to some extent. In FIG. 8(A), a microcomputer write implies a data transfer write from the RAM 47 to the buffer FIFOTDO. The JTAG output implies a transfer data output from the buffer FIFOTDO to the target microcomputer 33. SP represents a status polling processing of the access permission bit from the target microcomputer 33.

Figure 9:
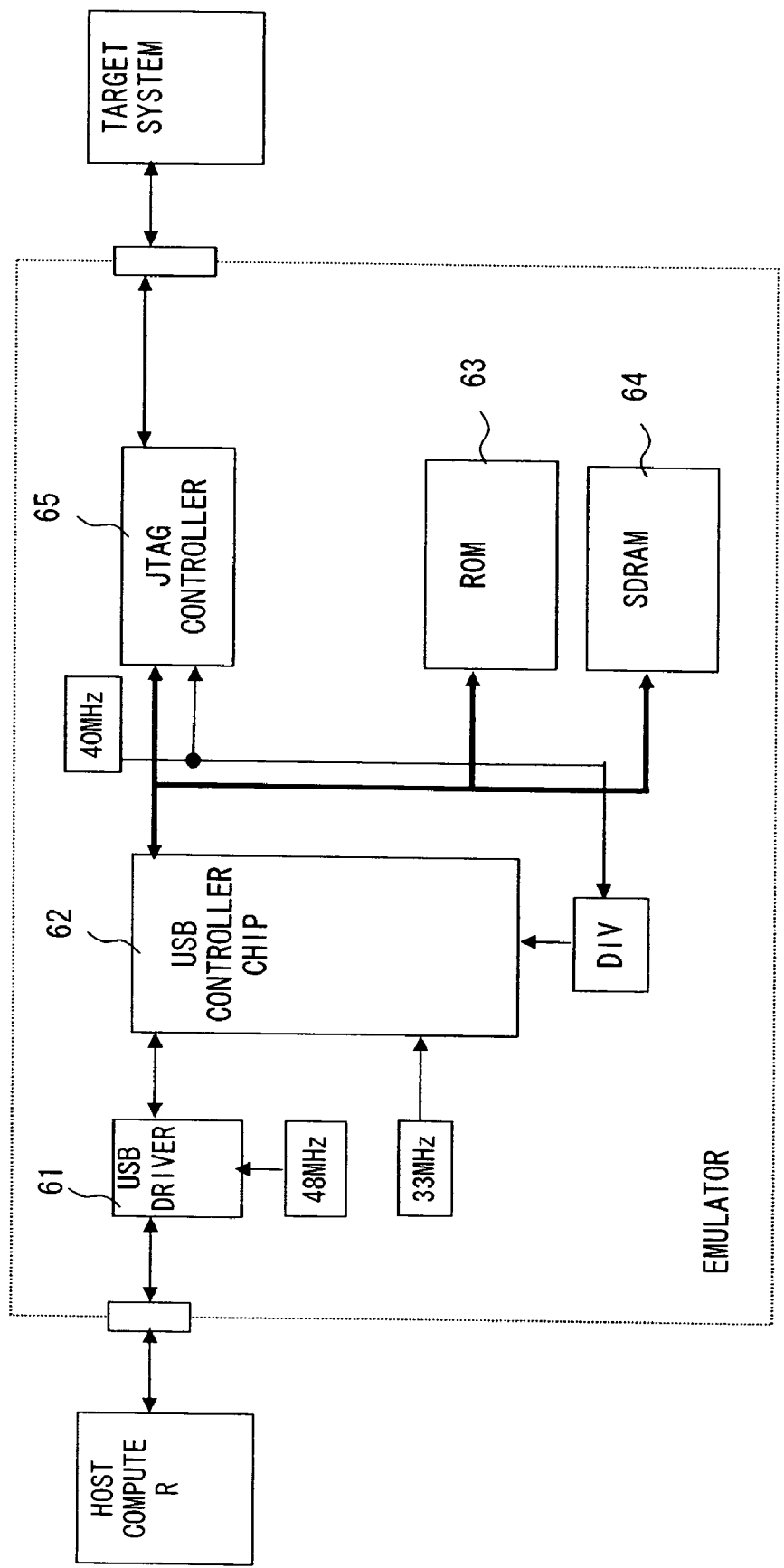
FIG. 9 is a block diagram illustrating an emulator according to a comparative example of FIG. 5.

FIG. 9 illustrates an emulator according to a comparative example. A USB is used for an interface with a host computer.

A USB driver 61 and a USB controller microcomputer chip 62 are provided. A program of the USB controller microcomputer chip 62 is stored in an ROM 63 and an SDRAM 64 is utilized as a work memory. The received USB data are once stored in the SDRAM 64 and data are stored in the SDRAM 64 through a USB packet analysis and the like and are then transmitted from a data output register of a JTAG controller 65 to a target microcomputer. In an interface based on the JTAG, the end of the transmitted data is carried out in a status acquiring mode in which an access permission bit can be received from a target CPU in a software download data transfer method. Moreover, a data transfer amount for each time is 4 bytes at a maximum. The emulator acquires an access permission bit indicative of the end of the status acquiring mode from the target microcomputer 33 every transfer. In short, the access permission bit is to be acquired during polling to set transfer data to the data output register (TDO). In this case, as shown in FIG. 8(B), an overhead T1 is generated from the detection of the access permission bit to the set of the transfer data. In brief, the data are set to the data output register (TDO) every 4-byte transfer in FIG. 8(B) and the data are previously set to the data output register (TDO) and are output in a 4-byte unit for each access permission bit acquirement by the hard logic 58 in FIG. 8(A).

Figure 10:
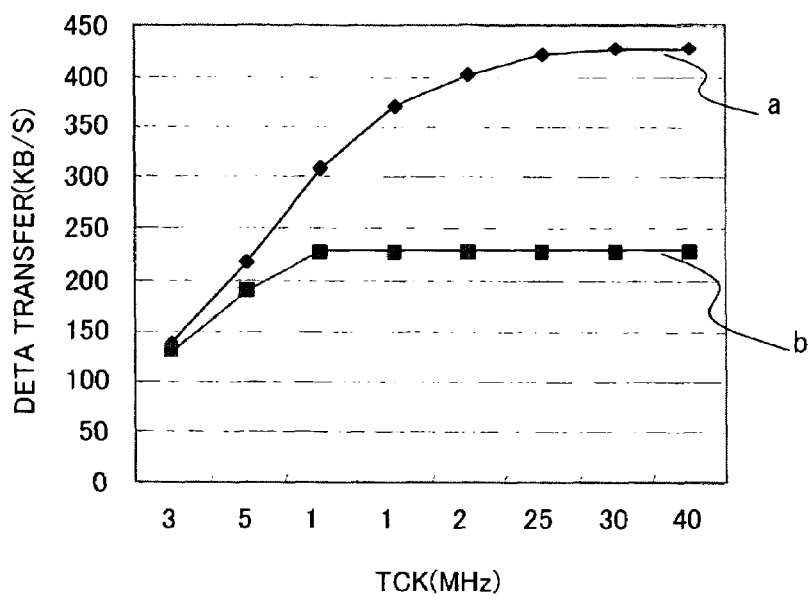
FIG. 10 is an explanatory chart illustrating a download performance obtained when downloading a user program file from the host computer in each of the example of FIG. 5 and the comparative example of FIG. 9.

FIG. 10 shows a download performance in the case in which a user program file of 1 megabyte is downloaded from a host computer PC into an external memory of the target microcomputer in relation to the example of FIG. 5 and the comparative example of FIG. 9. A trend line "a" corresponds to FIG. 5 and a trend line "b" corresponds to FIG. 9. When data are to be transferred from the host computer to the target microcomputer, consequently, the program download performance in the comparative example of FIG. 9 is not changed but maintained to be 230 KB/second at TCK=10 MHz or more.

In the example of FIG. 5, the download performance is enhanced linearly at TCK=10 MHz or more. In case of TCK=20 MHz, moreover, the download performance is 400 KB/second which is approximately a double.

Figure 11:
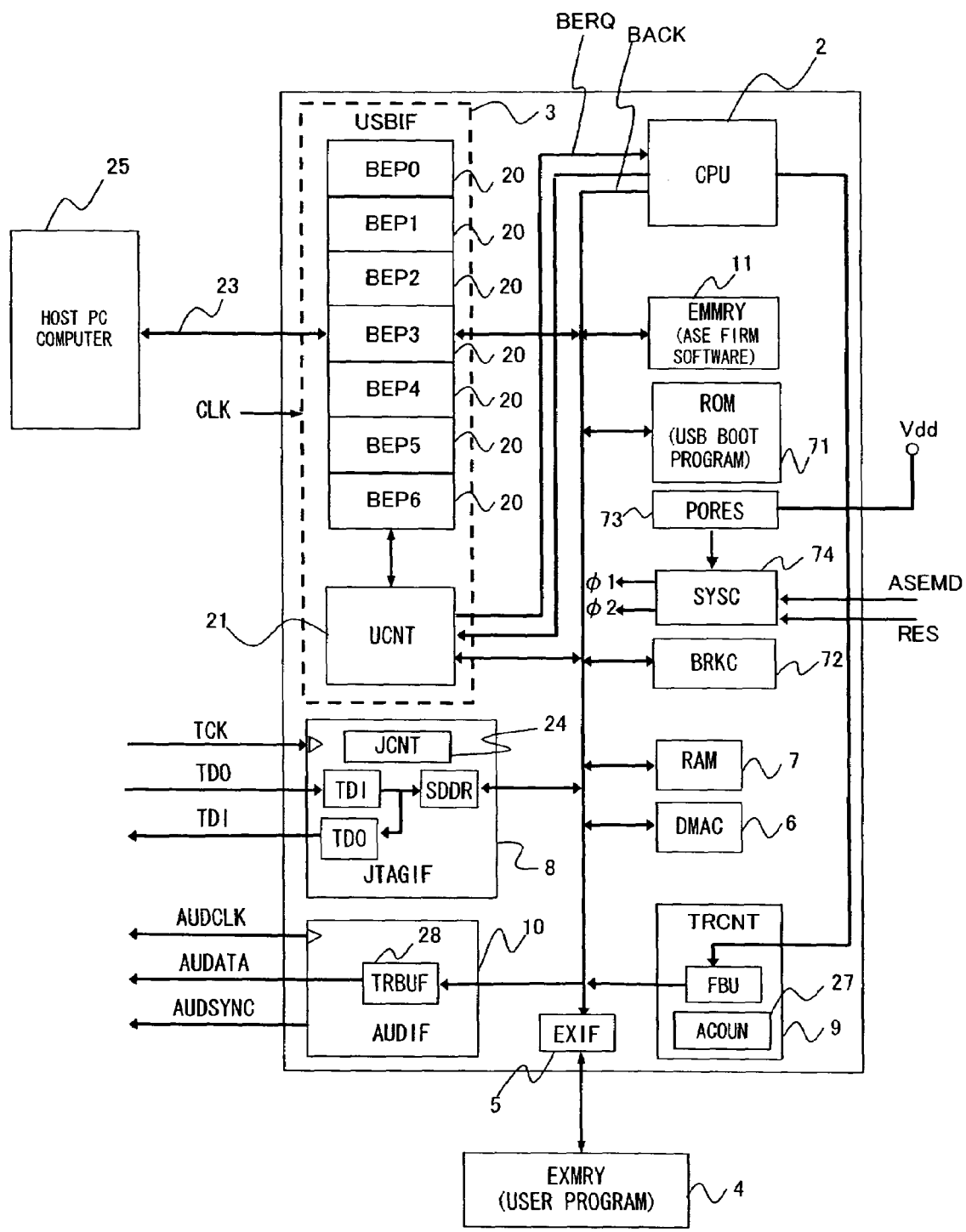
FIG. 11 is a block diagram showing a more specific example of the microcomputer according to the invention.

FIG. 11 shows a further specific example of the microcomputer 1. FIG. 11 is different from FIG. 1 in that a plurality of USB buffer portions (BEP 0 to BEP 6) 20 is provided in a USB interface circuit 3. Furthermore, there is shown an ROM 71 retaining a boot program. An emulation memory 11 is constituted by an SRAM and the ROM 71 is constituted by an electrically rewritable nonvolatile memory such as a mask ROM, an EEPROM or a flash memory. In addition, a break circuit 72 is provided. In the break circuit 72, a break condition is set through a CPU 2 in a debugging mode and the generation of a coincident state with the break condition is detected in a user mode, and a request for a break exception is given to the CPU 2.

Each of the BEP 0 to BEP 6 of the USB buffer portions 20 implies an FIFO (First-In First-Out) buffer which is referred to as an endpoint in the USB standards. The FIFO buffer has such a double buffer structure as to prepare for an input (IN) and an output (OUT) respectively, and is constituted like the EP 1 and EP 2 shown in FIG. 1. It is to be understood that the BEP 0 is an endpoint 0 and the BEP 6 is an endpoint 6. A number of the endpoint is an example. A maximum number of the endpoint which can be possessed by a USB device is defined based on the USB standards. The endpoint 0 (BEP 0) is used for a control transfer and is indispensable to the USB device. The USB interface circuit 3 can be utilized in both a user mode and a debugging mode. In the USB buffer portions (BEP 0 to BEP 6) 20, the BEP1 and the BEP2 are dedicated to a use based on a user program and the BEP 3 to the BEP6 are dedicated to a debugging support. The BEP 0 is shared by both of them. The BEP 0 is used for a control transfer of descriptor information dedicated to on-chip debugging. The BEP 3 is utilized for a bulk-out transfer of USB data. The BEP 4 is utilized for a bulk-in transfer of the USB data. The BEP 5 is utilized for inputting an instruction command. The BEP 6 is utilized for outputting status information. The BEP 1 and the BEP 2 are utilized for inputting/outputting data in accordance with the set of a user in the user mode. The USB interface circuit 3 is operated synchronously with a clock signal CLK having a frequency of 48 MHz, for example, which is given from an outside. The CLK may be generated through a PLL circuit in a microcomputer 1.

A boot program retained in the ROM 71 is not particularly restricted but is set to be a USB initialization control program for initializing the USB interface circuit 3 and a transfer control program. The transfer control program serves to store, in the emulation memory 11, a debugging support program (which will also be referred to as ASE firm software) received through the USB interface circuit 3.

A system controller (an SYSC 74) is connected as an external terminal shown typically to a debugging mode terminal ASEMD and a reset terminal RES, and furthermore, a power-on reset signal output from a power-on reset circuit (PORES) 73 is supplied to control an operation mode of the microcomputer 1 in accordance with their inputs. In the SYSC 74, a user mode is designated by the debugging mode terminal ASEMD. When a power-on reset instruction is given from the power-on reset circuit 73 or a reset instruction is given from the reset terminal RES, a CPU 2 is initialized in response to a control signal $\phi1$. The CPU 2 executes the USB initialization control program retained in the ROM 71 to enable the operations of the endpoints BEP 0, BEP 1 and BEP 2 to be carried out. In the CPU 2, finally, the execution of an instruction given from a head address in a program storage region can be started. On the other hand, in the SYSC 74, a debugging mode is designated by the debugging mode terminal ASEMD. When a power-on reset instruction is given from the power-on reset circuit 73, the CPU 2 is initialized in response to a control signal $\phi2$ so that the CPU 2 executes the USB initialization control program retained in the ROM 71 to enable the endpoints BEP 0 to BEP 6 to be operated. Then, the CPU 2 executes the transfer control program retained in the ROM 71 to store, in the emulation memory 11, a debugging support program (which will also be referred to as ASE firm software) received through the USB interface circuit 3. Finally, the CPU 2 is caused to enable the transferred ASE firm software to be executed. In a state in which the user program branched into the user mode is executed in the debugging mode, a reset instruction in the debugging mode itself is masked even if the reset instruction of the RES is given. The reason is that a jump to a reset vector through a reset input is enabled to be verified when the user program branched from the debugging mode to the user mode is executed.

In the case in which a user program is downloaded from a host computer 25 by the ASE firm software, the CPU 2 causes a DMAC 6 to transfer the user program received by the USBIF 3 to a buffer RAM 7 in response to a download request command received by the USBIF 3 in accordance with the ASE firm software. For example, after a communication with the USBIF 3 is completed, the CPU 2 causes the DMAC 6 to carry out a control to transfer a program transmitted to the buffer RAM 7 to an external memory 4 through an external bus interface circuit 5 in response to a transfer request command received by the USBIF 3 in accordance with the ASE firm software. The CPU 2 can make a transition to the user mode in response to a mode control command in the execution state of the ASE firm software. In the user mode, the CPU 2 can fetch and execute an instruction sent from the external memory 4.

Figure 12:
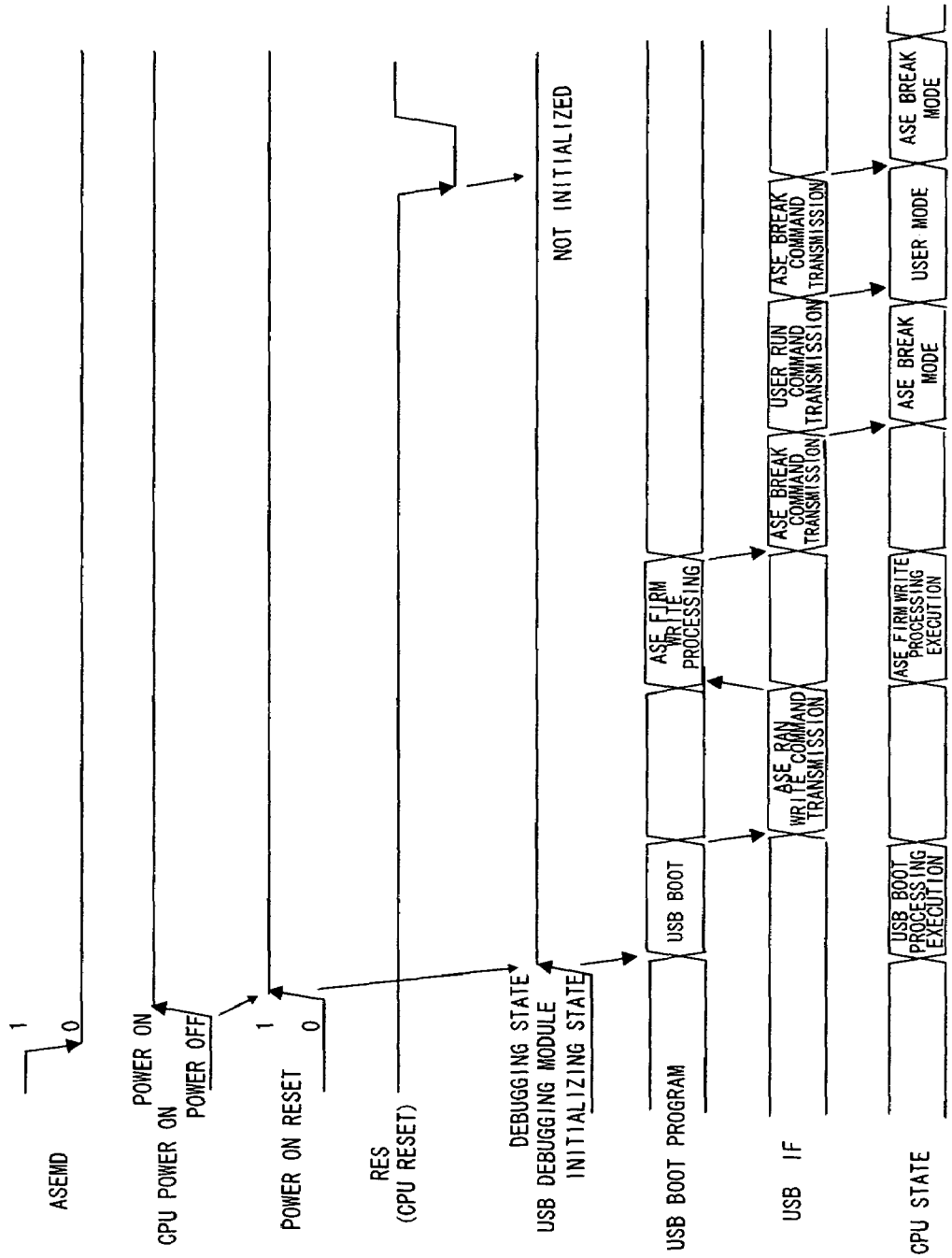
FIG. 12 is a timing chart illustrating an operation timing of on-chip debugging which is obtained by the microcomputer.

FIG. 12 illustrates an operation timing of on-chip debugging to be carried out by the microcomputer. At a time of t0, the ASEMD is set to have a low level and an instruction for a debugging mode is given. When a power supply is turned on at a time of t1 and an instruction for a power-on reset is given from the power-on reset circuit 73 (a time of t2), the control signal $\phi2$ is activated so that the CPU 2 is initialized. The CPU 2 executes the USB initialization control program retained in the ROM 71 to carry out a USB boot processing, thereby enabling the operations of the endpoints BEP 0 to BEP 6 to be carried out. Then, the CPU 2 executes the transfer control program retained in the ROM 71. More specifically, when a write command is received by the USB interface circuit 3, a debugging support program (which will also be referred to as ASE firm software) received through the USB interface circuit 3 is stored in the emulation memory 11 in response to the write command (an ASE firm write processing). After the ASE firm write processing is ended, the USB interface circuit 3 receives a break command from the host computer so that the CPU 2 can execute the ASE firm software over the EMMRY 11. When the USB interface circuit 3 receives a user program execution command from the host computer, then, a processing is branched into an address of the user program designated through the user program execution command so that the CPU 2 is caused to make a transition to the user mode for executing the user program. In the execution state of the user program, when the USB interface circuit 3 receives a break command, for example, a break exception request BERQ is issued to the CPU 2 so that the execution of the user program carried out by the CPU 2 is stopped and the CPU 2 is thus caused to make a transition to the debugging mode for executing the ASE firm software again.

Figure 13:
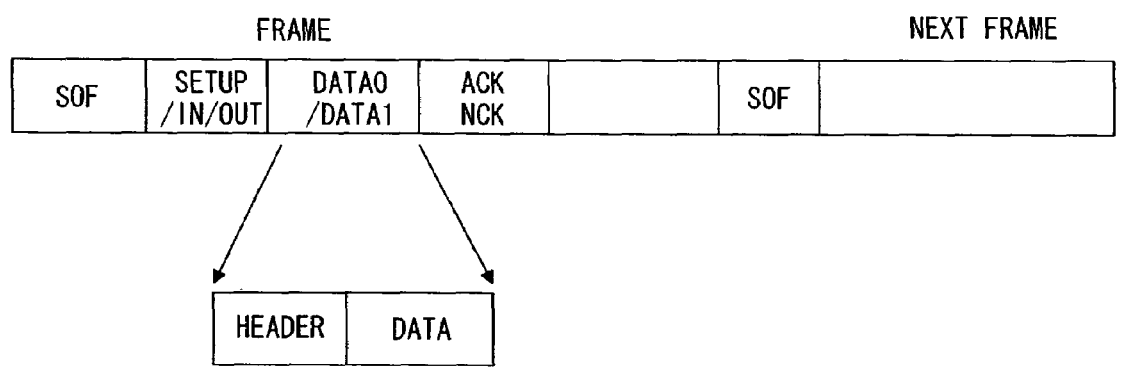
FIG. 13 is an explanatory diagram showing a communication format of a USB.

FIG. 13 illustrates a communication format of the USB. A head of one frame is set to be SOF (Start of frame). DATA0/DATA1 is set to be a data packet for on-chip debugging in the frame of the USB communication format in the USB standards. Read/write of the DATA0/DATA1 is carried out by each BEP. The USB packet data for the on-chip debugging are constituted by a header and data. The header includes information about an identification ID, a data size, a status and an instruction command. The data information include information about download data.

FIG. 14 illustrates a basic form of a communication handshake control of the host computer 25 (PC side) and the USB interface circuit 3. A USB data packet transmitted from the host computer 25 is received by an EP 3. Next, the CPU 2 reads and analyzes the USB data packet received by the EP 3 in accordance with the ASE firm program, and carries out a control corresponding to a result of the analysis and transmits a result of the control from an EP 4 to the host computer 25.

FIG. 15 illustrates the contents of the handshake control between the host computer 25 and the USB interface control 3 in the case in which a forcible break is carried out during the execution of a user program. An EP 5 is used as an instruction command receipt dedicated buffer. An instruction command packet received by the EP 5 is analyzed and a request for a break exception processing is given from a USB control circuit 21 to the CPU 2 in response thereto, and a vector address of the ASE firm is given. The CPU 2 jumps from the execution state of the user program to an address of the break of the ASE firm program. The USB interface control circuit 21 receives a break acknowledge BACK from the CPU 2, and sets status information (BACK) to an EP 6 and transmits the status information to the host computer 25. The host computer 25 ascertains whether the status is set in a breaking state or not.

Figure 16:
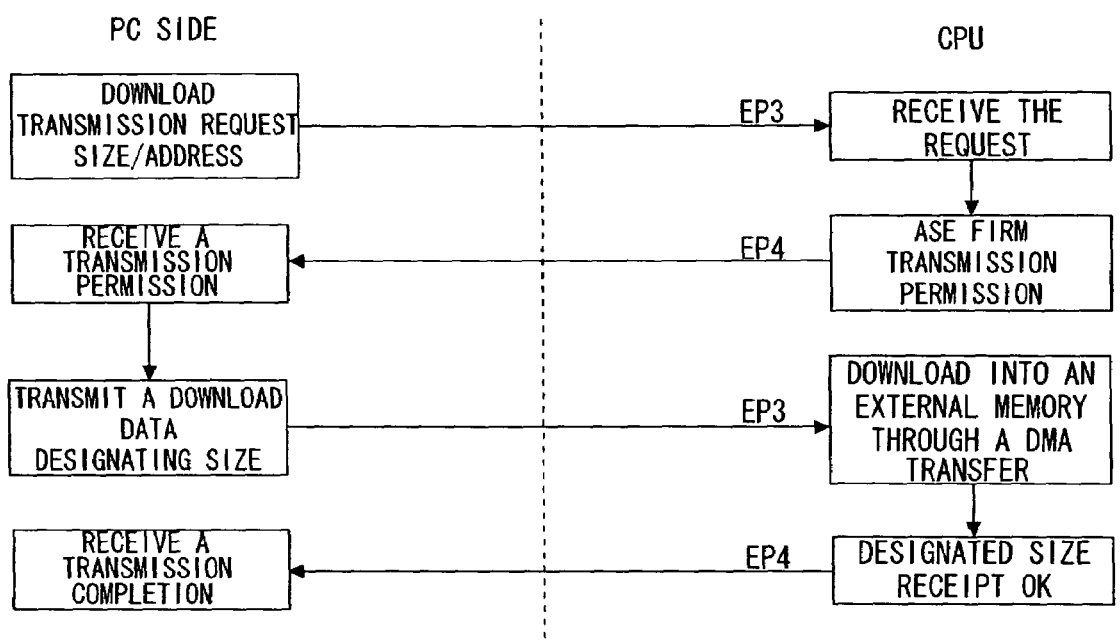
FIG. 16 is a flowchart illustrating control contents of the download of software from the host computer into the USB interface circuit.

FIG. 16 illustrates the contents of the control of a download of software (a user program) from the host computer 25 to the USB interface circuit 3. A transfer size and a load destination address are transmitted to the BEP 3 together with a software download transmission request by the host computer 25. On the other hand, a transmission permission is transferred from the CPU 2 to the host computer 25 through the BEP 4. When the transfer is completed, download data are transmitted from the host computer 25 to the USB interface circuit 3 corresponding to a designated size. At this time, if the same data are received to the BEP 3 of the USB interface circuit 3, a DMA transfer is carried out to directly write the same data to an external memory 4 by a USB interruption. When the transmission is completed corresponding to a designated size, the completion of the transmission is transferred to the host computer 25 through the EP 4.

Figure 17:
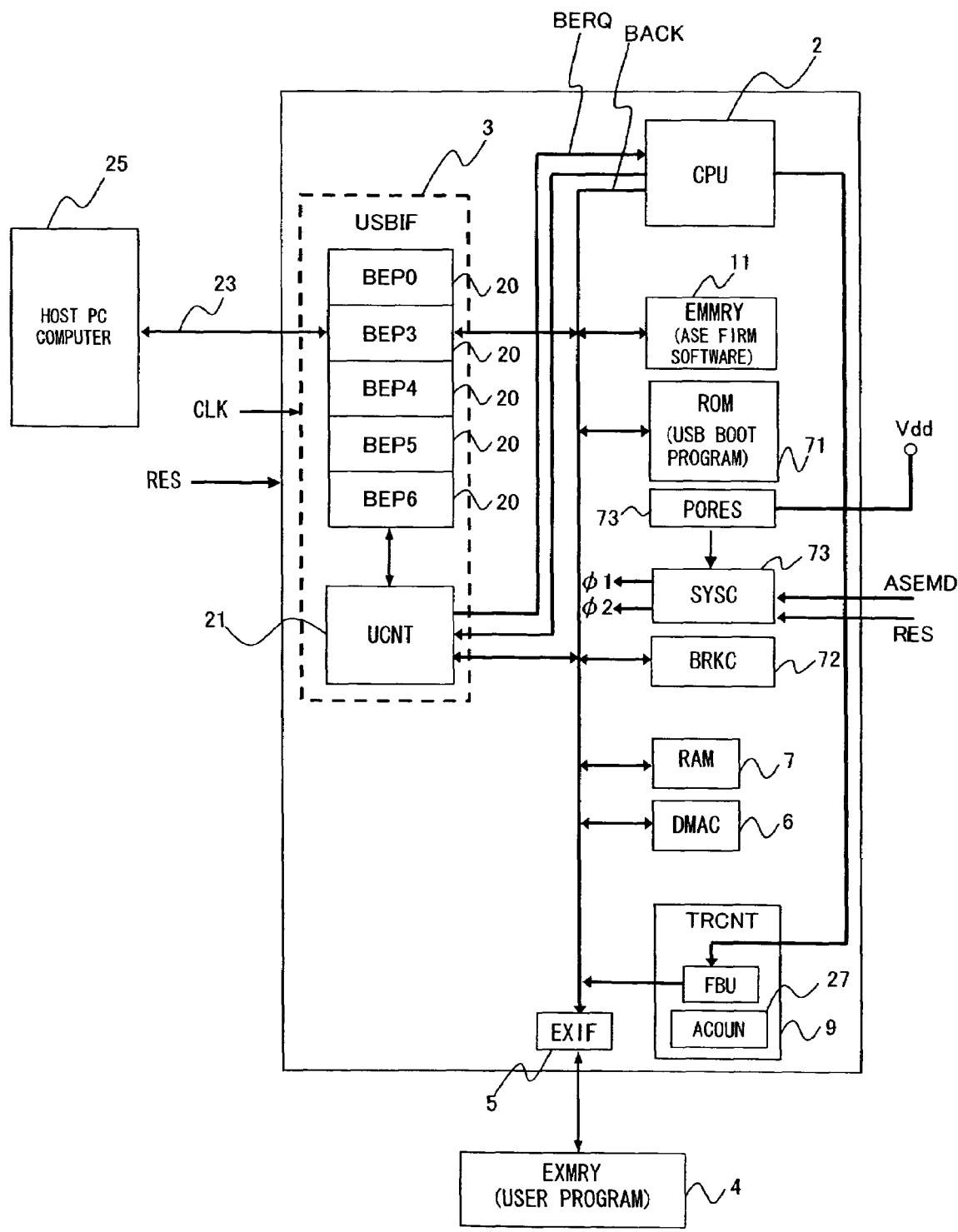
FIG. 17 is a block diagram showing a variant of the microcomputer in FIG. 1.

FIG. 17 shows a further example of the microcomputer 1. FIG. 17 is different from FIG. 11 in that the JTAGIF 8 and the AUDIF 10 are deleted, and furthermore, the USBIF 3 is dedicated to a debugging mode. The USBIF 3 does not include the BEP 1 and the BEP2. The USBIF 3 cannot be utilized as a user resource. The USBIF 3 can be used in only on-chip debugging. The AUDIF 10 is not required in the case in which an on-chip RAM 7 and an EXMRY 4 to be user resources can be used for storing trace data having a large capacity.

Figure 18:
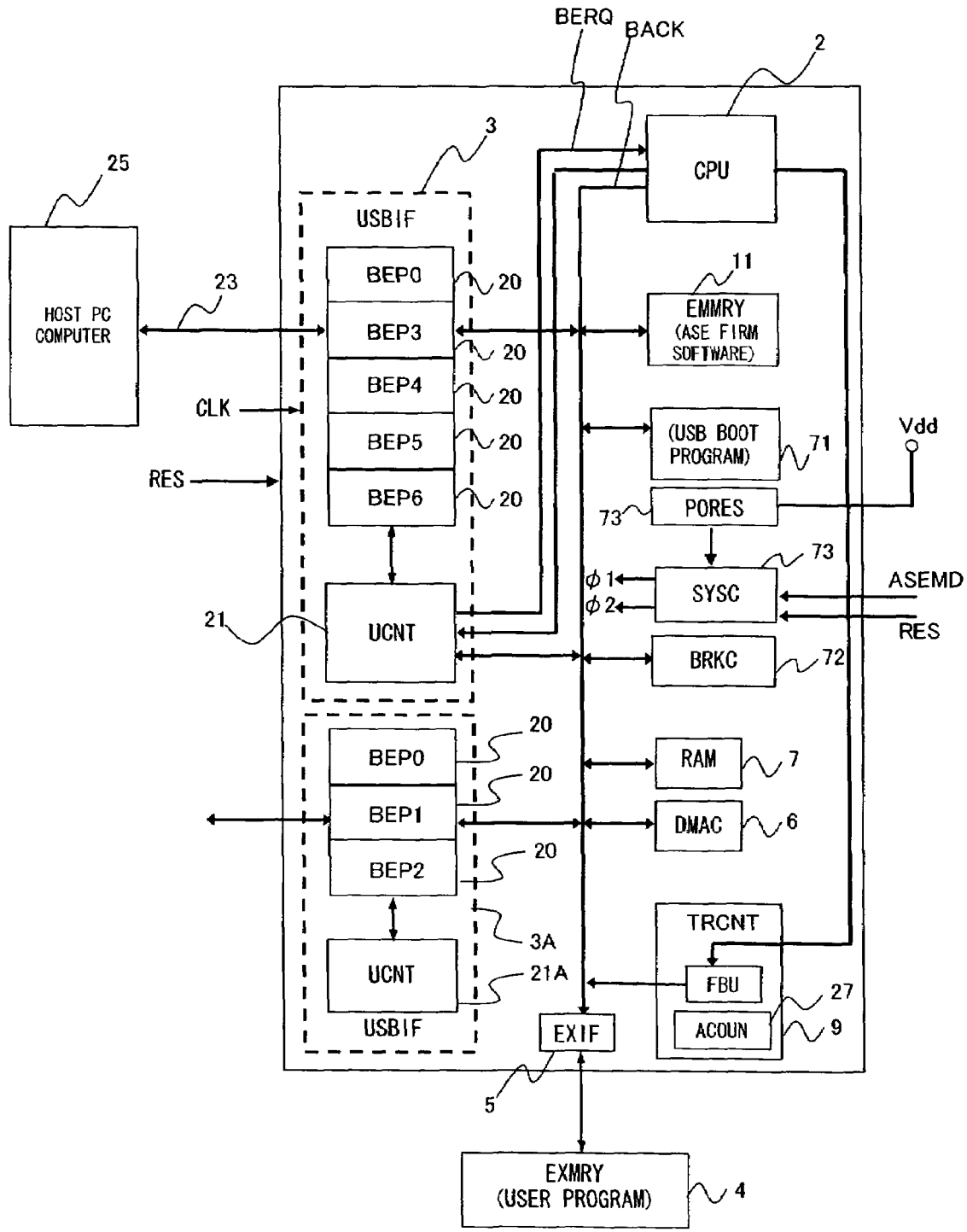
FIG. 18 is a block diagram showing a variant of the microcomputer in FIG. 17.

FIG. 18 shows a further example of the microcomputer 1. FIG. 18 is different from FIG. 17 in that a USBIF 3A is provided as a user dedicated resource. The USBIF 3A includes, as the user dedicated resources, a buffer 20 having BEP 0, BEP 1 and BEP 2 and a USB interface control circuit 21A. In each of on-chip debugging and a user mode, a perfectly dedicated USBIF can be utilized.

It is also possible to remove only the AUDIF 10 in FIG. 11, which is not particularly shown. The USBIF 3 is used in both the on-chip debugging and the user mode. In the case in which the USBIF 3 is subjected to debugging as the user resource, therefore, it is preferable to utilize the JTAGIF 8 as a debugging interface.

While the invention made by the inventor has been specifically described above based on the embodiment, it is apparent that the invention is not restricted thereto but various changes can be made without departing from the scope thereof.

For example, a cache memory may be disposed between the CPU 2 and the internal bus 12. In the case in which a virtual address is supported, an address converting buffer may be disposed between the CPU 2 and the internal bus 12. The logics 41A and 41B are not restricted to be constituted by the FPGA.

The USBIF 3 described with reference to FIG. 11 can be applied to the USBIF 48 retained in the microcomputer 40 described with reference to FIG. 4. In this case, a user dedicated BEP is not required.

The invention can widely be applied to a microcomputer, and particularly, a microcomputer having a debugging support function, and furthermore, a method for developing a system program which operates the microcomputer.

What is claimed is:

1. A microcomputer comprising:
a central processing unit;
a universal serial bus interface circuit which can be utilized as a debugging interface; and
an external bus interface circuit which can be connected to an external memory,
wherein the universal serial bus interface circuit includes a plurality of input buffers, and data is output from one of said input buffers in parallel with an input operation to another of said input buffers,
wherein the universal serial bus interface circuit receives a system program in a debugging mode, and the system program thus received can be output from the external bus interface circuit together with a memory access control signal,
wherein the microcomputer further comprises a direct memory access controller configured to perform a control to transfer the received system program to a memory connected to the external bus interface, and
wherein a transfer source of the system program through the direct memory access controller is one of said input buffers of the universal serial bus interface circuit.

2. A microcomputer comprising:
a central processing unit;
a universal serial bus interface circuit which can be utilized as a debugging interface; and
an external bus interface circuit which can be connected to an external memory,
wherein the universal serial bus interface circuit includes a plurality of input buffers, and data is output from one of said input buffers in parallel with an input operation to another of said input buffers,
wherein the universal serial bus interface circuit receives a system program in a debugging mode, and the system program thus received can be output from the external bus interface circuit together with a memory access control signal,
wherein the microcomputer further comprises:
a direct memory access controller configured to perform a control to transfer the received system program to the external memory connected to the external bus interface; and
a random access memory configured to temporarily store the system program received by said one input buffer of the universal serial bus interface circuit,
wherein a transfer source of the system program through the direct memory access controller is the random access memory.

3. A microcomputer comprising:
a central processing unit;
a high-speed serial communication interface circuit which can be utilized as a debugging interface; and
an external bus interface circuit which can be connected to an external memory,
wherein the high-speed serial communication interface circuit includes a plurality of input buffers therein, and data is output from one of said input buffers in parallel with an input operation to another of said input buffers, and
the high-speed serial communication interface circuit is configured to receive a system program in the debugging mode, and the system program thus received can be output from the external bus interface circuit together with a memory access control signal,
wherein the microcomputer further comprises a debugging dedicated low-speed serial communication interface circuit which is usable to input control data to control the high-speed serial communication interface circuit in the debugging mode, and
the debugging dedicated low-speed serial communication interface circuit is usable in place of the high-speed serial communication interface circuit for receiving the system program in the debugging mode.

4. The microcomputer according to claim 3, wherein the debugging dedicated low-speed serial communication interface circuit is based on JTAG protocol and includes a data register.

5. The microcomputer according to claim 3, further comprising a trace control circuit, the trace control circuit successively storing, as trace information, an internal state obtained when the central processing unit executes the system program.

6. The microcomputer according to claim 5, wherein the high-speed serial communication interface circuit can be utilized for an external output of the trace information.

7. A method of developing a system program which is to be executed by a target device using a host computer, an emulator, and the target device, comprising:
- a first process of storing a first system program portion output through high-speed serial communication by the host computer in a buffer of a two-plane buffer as a processing to be carried out by the emulator;
- a second process of transmitting a second system program portion stored in another buffer of the two-plane buffer to the target device through low-speed serial communication in parallel with the first process; and
- a third process of carrying out a handshake control of the low-speed serial communication with the target device,
- wherein the second system program portion output from said another buffer is transmitted through the low-speed serial communication to the target device via FIFO buffer having a storage capacity which is equal to or larger than that of said another buffer in the second process, and
- a transmission from the FIFO buffer to the target device is carried out in response to a transmission permission sent from the target device, thereby suppressing a transfer from said another buffer to the FIFO buffer in response to a full state of the FIFO buffer in the third process.

8. A microcomputer having a user mode and a debugging mode, comprising:
- a central processing unit;
- a universal serial bus interface circuit;
- a ROM retaining a first debugging control program;
- a RAM; and
- an external bus interface circuit,
- wherein the universal serial bus interface circuit has a predetermined endpoint buffer circuit which can be utilized in the debugging mode, the predetermined endpoint buffer circuit has a pair of buffers which can be operated in parallel, and one of the buffers can be caused to carry out an input operation and the other buffer can be caused to carry out an output operation in parallel therewith, and
- when the debugging mode is designated in a power-on reset, the central processing unit executes the first debugging control program to initialize the universal serial bus interface circuit to be operable, a second debugging control program is received by the universal serial bus interface circuit, the second debugging control program thus received is stored in the RAM, and a transition to an execution of the second debugging control program stored in the RAM is made.

9. The microcomputer according to claim 8, further comprising a buffer RAM and a direct memory access controller,
- wherein the central processing unit causes the direct memory access controller to transfer the second debugging control program received by the universal serial bus interface circuit to the buffer RAM in response to a download request command received by the universal serial bus interface circuit in accordance with the second debugging control program.

10. The microcomputer according to claim 9, wherein the central processing unit causes the direct memory access controller to carry out a control to transfer the second debugging control program transmitted to the buffer RAM through the external bus interface circuit to an outside in response to a transfer request command received by the universal serial bus interface circuit in accordance with the second debugging control program.

11. The microcomputer according to claim 8, wherein the central processing unit makes a transition to the user mode in response to a mode control command in an execution state of the second debugging control program, and
- the central processing unit fetches an instruction through the external bus interface circuit in the user mode.

12. A microcomputer comprising:
- a central processing unit;
- a universal serial bus interface circuit;
- a ROM retaining a first debugging control program;
- a buffer RAN; and
- an external interface circuit,
- wherein the universal serial bus interface circuit has a predetermined endpoint buffer circuit, the predetermined endpoint buffer circuit has a pair of buffers which can be operated in parallel, and one of the buffers can be caused to carry out an input operation and the other buffer can be caused to carry out an output operation in parallel therewith, and
- in a power-on reset, the central processing unit executes the first debugging control program to initialize the universal serial bus interface circuit to be operable, a second debugging control program is received by the universal serial bus interface circuit, the second debugging control program thus received is stored in the buffer RAM, and the second debugging control program stored in the buffer RAM is output through the external interface circuit.

13. The microcomputer according to claim 12, further comprising a direct memory access controller, the direct memory access controller transferring the second debugging control program from the buffer RAM to an outside through the external interface circuit in accordance with a transfer control condition set by the central processing unit.

* * * * *